Feb. 24, 1953          R. K. POTTER          2,629,778
VISUAL REPRESENTATION OF COMPLEX WAVES
Filed May 10, 1946                          3 Sheets-Sheet 1
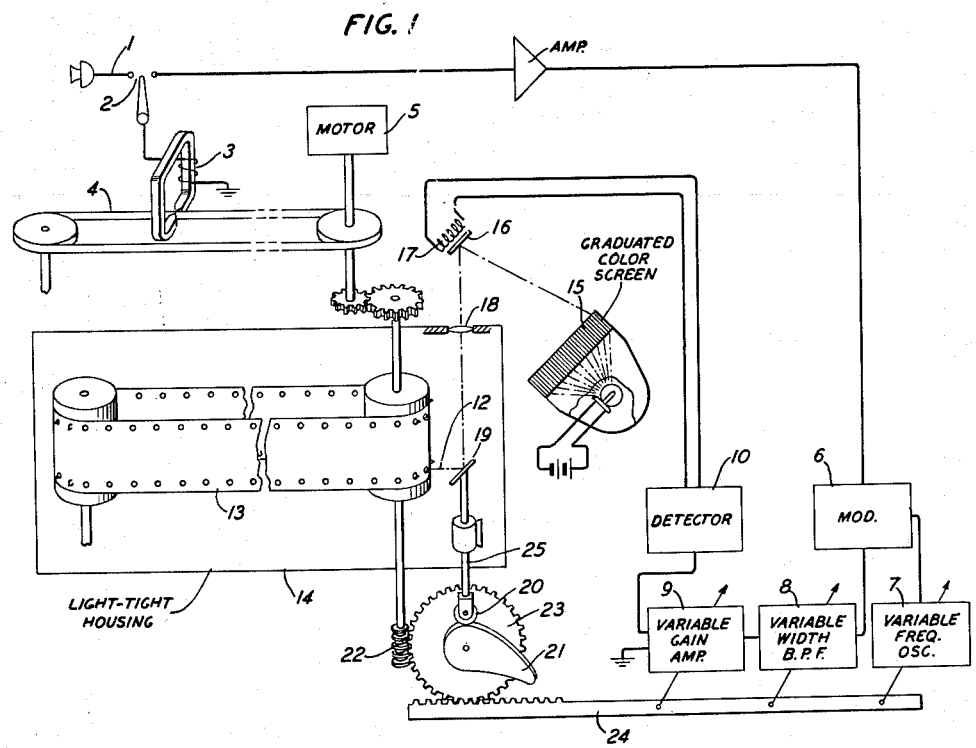
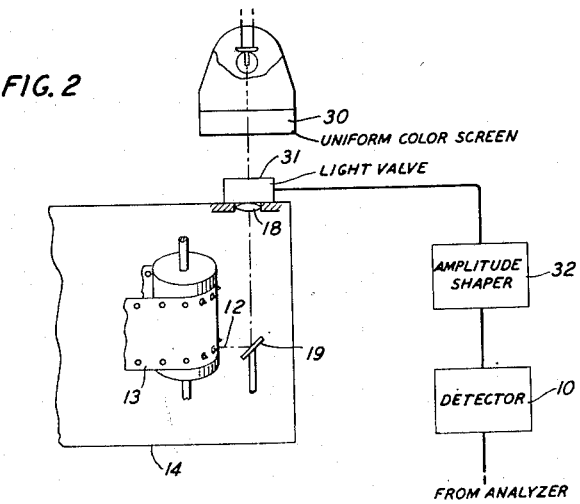
INVENTOR
R. K. POTTER
BY
N. S. Ewing
ATTORNEY Feb. 24, 1953 R. K. POTTER 2,629,778
VISUAL REPRESENTATION OF COMPLEX WAVES
Filed May 10, 1946 3 Sheets-Sheet 2

INVENTOR
R. K. POTTER
BY
N. D. Ewing
ATTORNEY

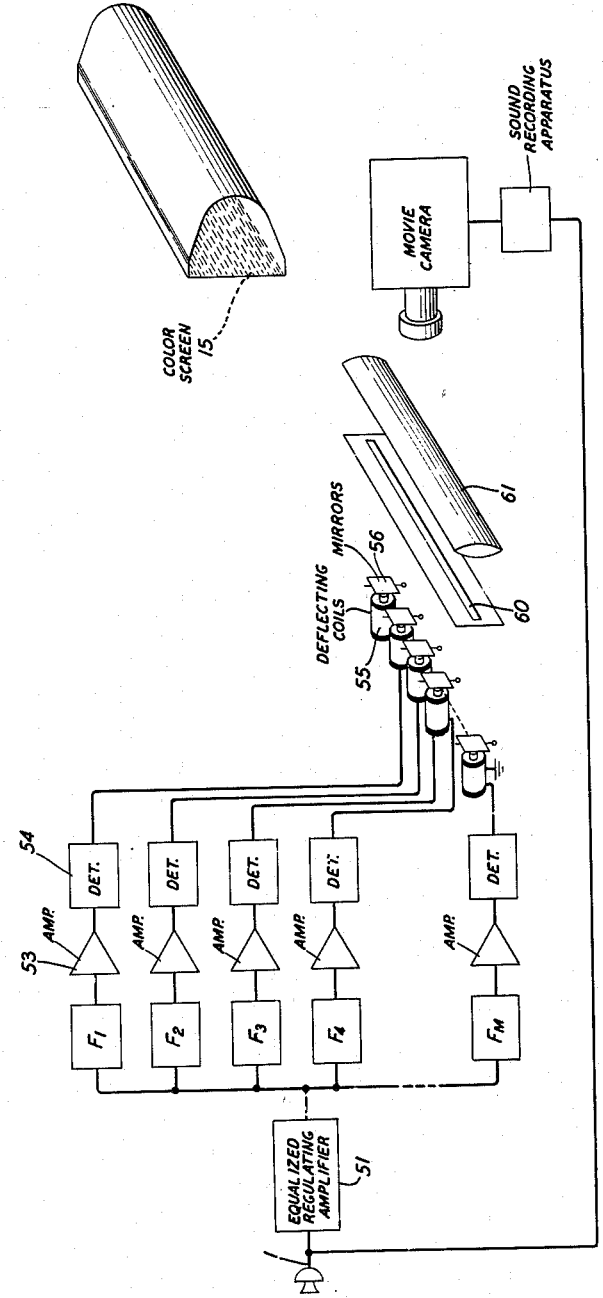

Patented Feb. 24, 1953

2,629,778

UNITED STATES PATENT OFFICE 2,629,778

VISUAL REPRESENTATION OF COMPLEX WAVES

Ralph K. Potter, Morristown, N. J., assignor to Bell Telephone Laboratories, Incorporated, New York, N. Y., a corporation of New York Application May 10, 1946, Serial No. 668,753

20 Claims. (Cl. 179—1)

This invention relates to the representation of complex waves in a visual form correlated with the frequency composition of the waves. This is the subject-matter also of my copending applications, Serial No. 438,878, filed April 14, 1942 (United States Patent No. 2,403,997, July 16, 1946), and Serial No. 586,769, filed April 5, 1945 (United States Patent No. 2,429,236, October 21, 1947).

In my said pending applications I have shown a form of wave representation in which one dimension of the visual representation has the sense of a frequency scale and another dimension has the sense of a time scale and in which the character of the representation is varied from one component elemental area to another to represent differences in the strength of the wave components. In certain embodiments the representation is recorded in permanent form in various shades of grey, the darkness of the representation at any point being indicative of the strength, or more particularly of the envelope amplitude, of the wave components that appeared in a particular frequency band at a particular moment.

In accordance with a principal feature of the present invention, differences in relative strength of the various (frequency) components of a complex wave are depicted in a visual representation of the kind described by corresponding differences in color. This feature is especially advantageous in certain analytical work where it is necessary to determine accurately from the visual record the relative strength of the different components represented therein, for it is found that the colors of a recording can be measured with great accuracy and are little subject to change with age. Furthermore, color variations lend themselves especially well to the visual representation of music.

The present invention is concerned in large part with methods and means for the production of complex wave representations in color but its nature will appear more fully and accurately upon consideration of the embodiments illustrated in the accompanying drawings and hereinafter to be described.

In the drawings,

Fig. 1 illustrates a system for recording wave representations, or "spectrograms," in color;

Figs. 2, 3 and 4 are illustrative of modifications of the Fig. 1 system;

Fig. 7 illustrates a system for producing a continuous wave spectogram in color directly on film and simultaneously recording the waves in reproducible form on the film.

Figure 3:
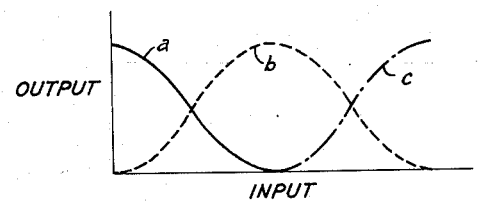

The strength or intensity factor that is represented at any point in a spectrogram of the kind described is the effective intensity or envelope amplitude of the wave component or components that appear in a preassigned frequency band or, in other words, it is the wave power content or varying average energy appearing in the predetermined band. This is not to be confused with the varying instantaneous amplitude of any of the wave components. The instantaneous amplitude of a single frequency component varies sinusoidally at a rate proportional to the frequency of the component, whereas the effective intensity or envelope amplitude or power content varies as the strength or loudness of the component varies.

The frequency analyzing and recording apparatus, or "sound spectrograph," that is employed to form a spectrogram of complex waves, such as speech-bearing or music-bearing waves, for example, may be designed to afford one degree of frequency resolution or another; that is, it may be designed to discriminate between wave components that differ only slightly in frequency and to show these components distinctly and separately in the spectrogram or it may be designed to have a much lesser degree of discrimination and to produce a spectrogram which, while it may have other virtues, is relatively lacking in frequency definition. The degree of frequency resolution is largely dependent upon the selectivity or band width of the means employed for resolving the complex wave into its various components.

A sound spectrograph embodying the present invention may have a frequency analyzer element that simulates the characteristics of the human ear, particularly with regard to the ability of the ear to distinguish tonal differences and with regard also to the response of the ear to rapid changes in the strength of the several components of a complex wave or sound. In accordance with this feature the selectivity or band width of the frequency analyzer element of the spectrograph may be designed to conform with that of the frequency selective elements of the ear. More particularly the spectrograph may be designed to have a certain frequency resolution that is uniform over the audio frequency range of interest and approximates the average frequency resolution of the ear over the same range, or it may have a frequency resolution that varies over the frequency range in closer conformity with the varying frequency resolution of the human ear. Correspondingly, the time resolution of the spectrograph, that is, the faithfulness with which the device responds to time variations in effective intensity, substantially matches the imperfect response characteristic of the ear. The frequency analyzer means, which may be a resonator or band-pass filter for example, is like the ear in that it does not respond instantly to a sudden change in either direction in the effective intensity of a component. In both cases the intensity builds up or decays gradually and at a rate correlated with the frequency resolution.

The sound spectrograph may be designed also to produce a spectrogram in which the frequency scale is logarithmic, whereby frequency components in octave relation are represented at equally spaced positions along the frequency scale in further simulation of human hearing. In spectrograms of music embodying these features equal prominence is given to musical activity in all octaves and the spectrograms are otherwise aesthetically proper and pleasing.

In the production of speech spectrograms, the band width of the analyzing means may be made wide enough to embrace a plurality of successive harmonics of the fundamental voice frequency so as to yield a high degree of time resolution and a more easily readable translation of various unvoiced speech sounds such as those of explosive character. Also there may be a certain degree of overlapping of the frequency bands selected by the analyzer means so as to yield a speech spectrogram in which the relative positions and width of the several resonance regions associated with voiced sounds are clearly pictured without the unnecessary and distracting detail of the harmonic structure of such sounds. For further details regarding frequency resolution and frequency scales reference may be had to the later filed of my applications, supra.

Referring now to the specific sound spectrograph that is illustrated schematically in Fig. 1, complex sound bearing waves that are to be translated into visual form are first stored in reproducible form. Arriving over microphone circuit 1, these waves are applied through switch 2 to the recording coil 3 of a magnetic recorder-reproducer. The latter may be of any well-known type and is symbolized in Fig. 1 by an endless magnetic tape 4 that passes between the pole-pieces of the recorder and that is driven at constant speed by a motor 5. Once the waves are recorded the recorder-reproducer plays them back, or electrically reproduces them, over and over again.

On moving switch 2 to its alternate position the reproduced waves are applied through an amplifier to a frequency scanner or heterodyne analyzer comprising elements 6, 7 and 8. The element 8 is a band-pass filter, a frequency selective device that passes any waves having a frequency that falls within its pass-band. Modulator 6 and its associated beating oscillator 7 together constitute a frequency translator by means of which the applied complex waves can be shifted to a higher frequency range dependent on the operating frequency of oscillator 7. The oscillator frequency is progressively changed from one reproduction of the recorded waves to another so that progressively different parts of the complex wave band are made to coincide with the pass-band of filter 8. In the course of producing a single spectrogram the entire complex wave band is moved gradually, from one extreme position to another, across the pass-band of filter 8. In effect, the heterodyne analyzer scans the frequency range occupied by the complex waves and selects the wave components that appear in progressively different parts thereof. The oscillator frequency may be changed at the end of each reproduction, or it may be changed continuously, the slight change in frequency that occurs during any one reproduction being insignificant in the latter case.

The record surface in the Fig. 1 system is afforded by an endless belt 13 of color film, which may be "Kodachrome" film, if desired. The belt is driven from motor 5 in synchronism with the magnetic tape 4. In a manner to be described an optical marker symbolized by the light beam 12, is directed against the surface of the film 13 and caused to move once across the film, i. e., in a direction normal to the direction of motion of the film, in the course of production of a single spectrogram. Each position of the marker 12 crosswise of the film 13 is therefore identified with a respectively corresponding setting of the frequency of oscillator 7 and with a particular component frequency band selected by the heterodyne analyzer. The wave output of filter 8, operating on elements to be described, controls the color of the beam of light 12 and causes the color to vary in predetermined correlation with the variations in strength of the components being passed by filter 8.

The optical marker 12 in Fig. 1 is formed by means including a mirror galvanometer element comprising rotatable mirror 16 and driving coil 17. Mirror 16 directs light from an illuminated translucent graduated color screen 15 through an optical aperture 18 and across film 13 to a mirror 19 which is tilted at an angle of 45 degrees to reflect the beam of light 12 upon the film. The mirror 19 is mounted on the end of a shaft 25 the other end of which terminates in a follower 20 that rides on a rotary cam 21, the latter being driven at a slow rate in timed relation with the movement of the film 13 by means of a mechanical linkage including a worm gear 22 and a pinion 23.

The wave output of filter 8 is passed through an amplifier 9 to a detector 10 which applies to driving coil 17 a unidirectional current that fluctuates substantially in conformity with the variations in envelope amplitude of the waves passed by the filter 8. The mirror 16 is thereby varied in angular position in dependence on the strength of the selected components. The elements of the optical system are so designed and arranged that in any operating position of mirrors 16 and 19 a small spot of light is focussed on the surface of film 13 (at the point of impingement of beam 12), the color of that spot of light depending on the angular position of mirror 16 and therefore on the color of the particular portion of screen 15 that is reflected into aperture element 18. The various colors on screen 15 may be the colors of the spectrum arranged in natural order or a series of colors arbitrarily arranged in contiguous bands, if desired, but in any case a particular color is identified with each different operating position of the mirror 16 so that the color of the light reaching film 13 is definitely identified with a predetermined value or range of values of envelope amplitude. There may be, for example, a hundred or more such colors and ranges of value.

The background color of the spectrogram, that is, the color of the areas representing substantially zero values of envelope amplitude, may be fixed as desired by providing the desired color in the proper position on color screen 15.

The operating frequency of oscillator 7 is automatically varied in synchronism with the repeated reproduction of the recorded waves by any suitable mechanical system such as one including a rack 24 driven by pinion 23. The band width of filter 8 and the gain of amplifier 9 may be varied by the same means in the manner and for the purposes set forth in the later of my applications, supra.

Fig. 2 illustrates a modification of the Fig. 1 system in which, in place of the elements 15, 16 and 17 of Fig. 1, there is provided an illuminated translucent uniform color screen 30. In addition, a light valve 31 is interposed between screen 30 and the optical aperture 18 to control the intensity of the colored light that passes to mirror 19 and thence to the surface of film 13 as in Fig. 1. Light valve 31 is electrically connected through an amplitude shaper 32 to the output circuit of detector 10 whereby the light valve varies the intensity of the transmitted light in conformity with the varying strength of the detector output current as modified by the device 32.

In the operation of the Fig. 2 system a complete spectrogram in one of a plurality of predetermined colors is first recorded on the film 13, device 32 introducing a corresponding predetermined shaping characteristic; and the process is repeated one or more times using light of different color and corresponding different shaping characteristics. The amplitude modifying or shaping characteristic of the device 32 may assume successively the three different forms $a$, $b$, $c$, shown in Fig. 3, these to be used in conjunction with color screens 30 of corresponding different colors, such as red, yellow and blue. Fig. 3 illustrates also the approximate relation between detector output current and brightness of the light to which the film is exposed. The successive superposed exposures are followed by development of the film in the usual way. The resultant spectrogram is one in which the representation at any point comprises one or another of the three primary colors or a pair of such colors in a certain proportion, the particular color whether pure or composite being indicative of the strength factor.

The amplitude shaper 32 may take any suitable form of which many will occur to those skilled in the art. It may be designed to operate on the principle of the bias limiter, for example, or it may comprise a cathode-ray device such as disclosed in United States Patent 1,946,223, February 6, 1934, of W. P. Mason, or it may take the form of the photoelectric component of Fig. 1 in the application of W. Koenig, Jr., Serial No. 586,308, filed April 3, 1945 (United States Patent No. 2,403,983, July 16, 1946). In the latter case the mask 29 may have a single aperture 30 shaped to conform with one of the characteristic curves $a$, $b$, $c$, so that the strength of the current delivered by the photoelectric cell varies in conformity with the desired characteristic in response to variations in the input current derived from the analyzer.

Figure 4:
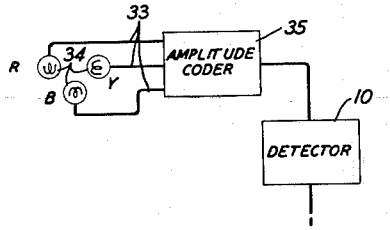

Numerous other means may be substituted for those herein shown for translating variations in the strength of the selected components, which variations are represented in the output current of detector 10, into predetermined uniquely correlated variations in the color of light impressed on film 13. Fig. 4 is representative of a type of translating system in which amplitude coding is employed for this purpose.

The amplitude coder 35 in Fig. 4 receives the current of varying intensity from detector 10 and delivers current separately to each of a multiplicity of output circuits 33, varying the distribution of current in the several circuits so that there is a different combination of current levels for each different level of input current. The output circuits 33 may be connected, as shown, to individual differently colored lamps 34, which may be red, yellow and blue, for example. The total light from the cluster of lamps may thereby be made to vary in color composition, and in strength also if desired, in unique correlation with the varying strength of the output current of detector 10. It will be understood that the Fig. 4 combination may be used in the Fig. 1 system in lieu of elements 15, 16, 17 to direct variably colored light into aperture 18. As a further alternative the coder 35 may be designed to energize the three circuits 33 periodically and to change the percentage of each period that the several circuits are so energized, as the input current thereto changes, in accordance with predetermined code combinations. The variation in the total light in such case may be made the same as in the preceding example.

Figure 5:
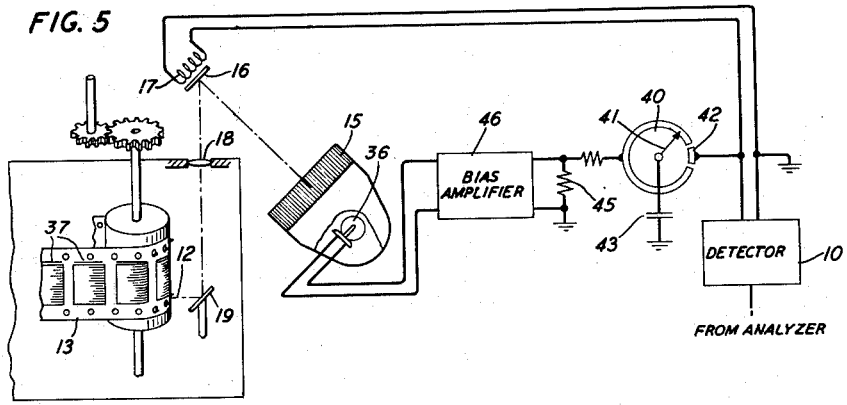
Fig. 5 represents a modified form of apparatus for producing a different type of wave representation in color directly on framed film.

Fig. 5 illustrates still another modification of the Fig. 1 system which adapts it to the production of a somewhat different type of visual representation on framed film. The representation takes the form of parallel vertical lines of different lengths stemming from the lower edge of the frame. The width of the frame is assigned the sense of a frequency scale so that each vertical line represents a predetermined frequency component. The strength of a component at the instant of time corresponding to the particular frame is indicated by the length of the line and also by its color. Color may be used alternatively or additionally to selectively indicate other effects within the pattern.

The modification of apparatus as compared with Fig. 1 lies principally in the means provided for illuminating the color screen 15 intermittently in a particular manner to be described. Synchronized with the movement of film 13 in Fig. 5 is a commutator 40 which completes a cycle of operation each time a frame passes the optical marker 12. The rotating contractor 41 of commutator 40 is connected to one terminal of a condenser 43, the other terminal of which is grounded. Momentarily during each cycle condenser 43 is connected, by means of a short commutator segment 42, to the output circuit of detector 10 and receives a charge therefrom the strength of which depends on the strength of the selected component at that moment. During the remainder of the cycle condenser 43 discharges through a circuit including resistor 45. The voltage across resistor 45 is applied to the input circuit of bias amplifier 46 which delivers current of proportionate strength to the lamp 36 that illuminates the graduated color screen 15.

Each time that commutator 40 initiates discharge of condenser 43, the resultant voltage applied to amplifier 46, if the voltage exceeds a predetermined value, causes lamp 36 to light and to remain lighted until the voltage falls below the predetermined value. Operations are so timed that lamp 36 lights at the moment the lower edge of the frame passes the position of light beam 12. The length of time lamp 36 remains lighted varies from one frame to another as the initial charge on condenser 43 varies, and hence the length of line drawn by the optical stylus varies from frame to frame substantially as the voltage in the output circuit of detector 10 varies.

The color of the light impressed on film 13 in Fig. 5 varies in conformity with variations in the output current of detector 10, for the optical system, including mirror 16, reflects light of one color or another to mirror 19 in the manner described with reference to Fig. 1.

If desired, the waves that are pictured on film 13 in the Fig. 5 system may also be recorded in conventional manner in a sound track on the same film during one reproduction of the waves from the magnetic tape 4. By use of a standard moving picture projector and sound reproducer one can then obtain synchronized audible and visual renditions of the recorded sound. In Fig. 5, the sound track is represented on film 13 by a line 37 along one side of each successive frame.

With the type of representation obtained in systems conforming with Figs. 1 and 2 it is entirely feasible to pass the film through a projector in timed relation with the reproduced music or other recorded subject-matter, although it may be preferred to transfer the representation to framed film first so that standard equipment can be used. In either case, i. e., whether transferred to framed film or not, it is contemplated that the pattern of several seconds' worth of the recorded waves may be viewed at any moment. A modified form of display may be obtained by projecting a distorted image of successive elements of the first-mentioned type of representation, the distortion being calculated to produce two-dimensional pictures from the essentially linear or strip-like successive elements. Each element, it will be understood represents the frequency composition at a given moment. Such distortion may be utilized to accentuate various effects in the patterns. One of many suitable distorting systems is shown in Fig. 6.

Figure 6:
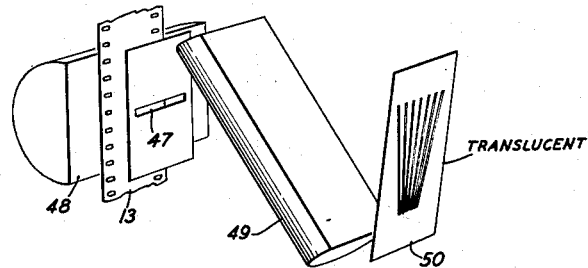
Fig. 6 illustrates an arrangement for translating a representation of the kind produced by the Fig. 1 system into a modified form for direct viewing or for recording on framed film.

Referring to Fig. 6, the film 13 is advanced continuously between an optical slit 47 and the planar face of a transversely disposed semicylindrical lens 48. The latter receives light from a source to the left, not shown. To the right of slit 47 and inclined toward the film at an angle of about 30 degrees is a second semicylindrical lens 49. Still further to the right is a translucent screen 50 which may be inclined in the opposite direction about 15 degrees. A fan-shaped image of the portion of spectrogram exposed in slit 47 appears on screen 50. In the image are radiating lines which represent the different frequency components appearing in the spectrogram. These change in color and in position continually in conformity with the variations appearing at slit 47. The image on screen 50 may be viewed directly or it may be transferred to framed film.

In Fig. 7 there is illustrated diagrammatically a system for translating received waves instantaneously and simultaneously with their reception into visual form. After passing through an equalized regulating amplifier 51 in which components are brought to approximately the same intensity level, the received waves are applied to a bank of analyzing filters F1, F2 . . . F*n* which may pass of the order of a hundred or more contiguous or somewhat overlapping frequency bands. The components passed by any of the filters are passed also through an individual amplifier 53 to an individual detector 54 which is designed like detector 10 of preceding figures to deliver an output current that varies in conformity with the variations in effective intensity or envelope amplitude of the applied components. Each of the detectors 54 is connected to the deflecting coil 55 of an individually corresponding galvanometer unit including mirror 56. All of the mirrors 56 are arranged in a substantially linear array, side by side or in somewhat overlapping relation, in a position to reflect light through a parallel slit 60 from one portion or another of graduated color screen 15 depending on the amount of deflection. Viewed from the right, slit 60 appears as an illuminated line that varies in color along its length, the variation in color indicating the variation in relative intensity of the various components.

A spectrogram of the type produced by the Fig. 1 system may be produced by photographing the line of light appearing in slit 60 with a camera of a kind in which the film advances continuously. An optical system symbolized by lens 61 may be interposed between the slit 60 and the camera to reduce or increase the width of the line of light as may be desired. If desired, optical distortion elements such as those shown in Fig. 6 may be interposed and a standard movie camera using frame film may be employed. In any case sound recording apparatus may be connected as indicated in Fig. 7 to record the received waves in a sound track on the film for the purpose of synchronized visual and audible reproduction.

Although the present invention has been described largely in terms of various specific embodiments, it will be understood that the invention is susceptible of embodiment in various forms within the spirit and scope of the appended claims.

What is claimed is:

1. The method of depicting complex waves which comprises recording the frequency-intensity composition of said waves at substantially a given instant as a line differing in color along its length, each point along said line being individual to a particular frequency component and the color at each said point being correlated with the intensity of the frequency component individual thereto, and similarly recording the frequency-intensity composition at successive instants of time as laterally contiguous lines, with the points individual to the same frequency components being in registry with each other.

2. The method which comprises receiving variable complex waves, continually deriving from the received waves separate effects each dependent on the amount of wave energy in a respectively corresponding predetermined frequency band within the frequency range of said complex waves, and continuously generating, contemporaneously with the reception of said waves and under the control of the said derived effects, a visual representation of the said waves in which one of the dimensional coordinates of the representation has the significance of a frequency axis and in which the color of the representation varies in predetermined correlation with changes in the character of said waves.

3. The method of forming a graphic representation of complex waves which comprises deriving from said waves individual measures of the manner in which wave intensity varies with time in respectively corresponding component frequency bands thereof and graphically recording the aforesaid manner of variation in substantially contiguous parallel lines individual to the said component bands, including the method step of varying the color of the recording in each of said lines in correlation with the time variation in the respectively corresponding measure.

4. In a system comprising a record surface and a recording marker, the method of depicting on said surface the time variations in the frequency intensity composition of a complex wave which comprises displacing said marker relative to said surface progressively in one direction as a function of time and repeatedly across said one direction through successive positions that are preassigned to respective different frequency components of the complex wave, and during each repeated displacement varying the color of the recording to mark at each successive position the strength of the respectively corresponding frequency component.

5. The method of portraying sound waves on a record surface, on which successive positions in one direction are preassigned to predetermined different audio frequencies and successive positions in another direction are preassigned to successive time intervals, which comprises successively selecting respective frequency components of said sound waves, continually recording the varying relative strength of the respective different wave components, in the positions on said surface assigned thereto, in the form of geometric variations, and varying the color of the recording in predetermined correlation with variations in said waves.

6. The method of recording complex waves which includes the steps of successively selecting respective frequency components of said complex waves and recording the variations in strength of the respective wave components in the form of color variations in different portions of a record surface respectively corresponding to different frequency bands.

7. The method of recording complex waves on color film which comprises recording the varying frequency composition of said waves on said film repeatedly, with the successive recordings in superposed relation, using light of successively different color and varying the intensity of said light in successively different predetermined correlation with the varying strength of the wave components being recorded.

8. The method of recording the varying frequency composition of applied waves on framed film which includes the steps of moving the said film lengthwise past a recording marker, the position of said marker crosswise of said film being identified with a particular part of the frequency range, said marker having alternately a marking condition and a non-marking condition, changing the said marker from one to another of said conditions as a predetermined part of each frame passes said marker, and changing the said marker from said other condition to said one condition under the control of the wave components in said particular part of the frequency range at a point in each frame dependent on the strength of said components.

9. In a system comprising a record surface and recording marker, the method of deriving a graphic representation of complex waves which comprises repeatedly reproducing said waves, imparting to said marker two components of motion relative to said record surface, one being progressive movement in a predetermined path across said surface and the other being movement cyclically across said path synchronized with the repetitions of the stored waves, and varying the color of the recording in accordance with the time variations in the intensity of successively different frequency components of said waves.

10. In combination with a sensitized surface and recording means relatively movable over said surface for impressing a visual representation thereon, means for causing said recording means systematically to traverse the entire said surface with simultaneous progressive movement in a first direction and continually repeated excursive movement in a second direction transverse to the first direction, means for selectively receiving the different frequency components of a complex wave, and means for regulating the color of the impression made by said recording means at each point on said surface according to the intensity of a selected frequency component the frequency of which is correlated with the position of said point along one of the relative directions of movement of said recording means.

11. In a system for the creation of a visual representation of complex waves, means providing a surface on which the visual representation is to be formed, recording means for producing at any point on said surface a visible impression of controllable color, means operative on said recording means for moving the point of impression progressively in one direction across said surface and repeatedly in a crosswise direction from one predetermined limit to another, successive positions in one of said directions being individual to respectively different frequencies within a predetermined frequency band including said complex waves and successive positions in the other of said directions being individual to respectively different instants of time, and means for continually varying the color of the impression made by said recording means during the aforesaid movement comprising means for deriving from said complex waves and applying to said recording means a control effect representative of the wave intensity at the frequency and instant corresponding to each successive position of the point of impression.

12. A complex wave pattern recorder comprising means for repeatedly reproducing the complex waves to be recorded, a record surface, optical marking means in marking relation to said surface, means for moving said marking means relative to and across said surface along a multiplicity of laterally adjacent paths in succession at a rate such that each path is traversed once while the stored waves are reproduced once, means for selecting a frequency component from the reproduced waves, means for progressively changing the selected component while the stored waves are being repeatedly reproduced, and means for varying the color of the mark made by said marking means under the control of the selected component.

13. As an article of manufacture, a photographic film having sound waves recorded in a sound track thereon and bearing patterns in color representative of the varying frequency composition of the sound waves recorded in said sound track, different portions of the film surface occupied by the pattern being identified with predetermined different frequency bands, and the color varying from one said portion to another in correlation with the variation in strength of the wave components of the corresponding frequency bands.

14. A record having a surface that carries a spectrographic representation of complex waves, said surface comprising a multiplicity of laterally adjacent, longitudinally extending regions in each of which the color of the representation varies along the length of the region in correlation with variations in the strength of the wave components appearing in a preassigned frequency band, the representations in the several regions that pertain to the same time interval being substantially in alignment crosswise of the record.

15. The method which comprises reproducing a musical composition and concurrently detecting time variations in wave energy at the different frequencies represented in the reproduced music, simultaneously producing a luminous pattern of which one dimensional coordinate has the sense of a frequency axis, and varying the color of the pattern at each of different points along the frequency axis, the different points respectively corresponding to the said different frequencies, in predetermined correlation with the detected variations in energy.

16. The method which comprises reproducing a musical composition and concurrently detecting time variations in wave energy at the different frequencies represented in the reproduced music, simultaneously producing a luminous pattern of which one dimensional coordinate has the sense of a logarithmic frequency axis, and varying the color of the pattern at each of different points along the said logarithmic frequency axis, the different points respectively corresponding to the said different frequencies, in predetermined correlation with the detected variations in energy, the time and frequency definition of the pattern at least approximately conforming with the resolution of the human ear.

17. As an article of manufacture, a photographic film having sound waves recorded in a sound track thereon and having in successive frames progressively different recorded patterns in color correlated with progressive changes in the frequency composition of corresponding different time fragments of the recorded waves, one of the dimensions of the patterns having the sense of a frequency axis, each pattern varying from point to point along the frequency axis in correlation with the frequency composition of the corresponding recorded waves, and the color at any such point varying from frame to frame in correlation with time variations in strength of the corresponding frequency component in the recorded waves.

18. As an article of manufacture, a photographic film having sound waves recorded in a sound track thereon and having in successive frames patterns in color changing from one frame to another in correlation with changes in the frequency composition of corresponding successively different portions of the recorded waves, different portions of a pattern being respective to corresponding different frequency bands, and the color of any such portion varying from one frame to another in correlation with changes in the wave energy content of the respectively corresponding frequency band of the recorded waves.

19. As an article of manufacture, a photographic film having sound waves recorded in a sound track thereon and having in successive frames patterns in color changing from one frame to another in correlation with changes in the frequency composition of corresponding successively different portions of the recorded waves, one of the dimensional coordinates of the patterns having the sense of a substantially octave scale and each pattern varying from one point to another along said scale as the energy content of the corresponding portion of the recorded waves varies from one part of the frequency range to another, the color of the pattern at any said point varying from one frame to another as the energy content of the corresponding part of the frequency range varies from one said portion of the recorded waves to another.

20. As an article of manufacture, a photographic film having sound waves recorded in a sound track thereon and having in successive frames patterns in color changing from one frame to another in correlation with changes in the frequency composition of corresponding successively different portions of the recorded waves, one of the dimensional coordinates of the patterns having the sense of a substantially octave scale and each pattern varying from one point to another along said scale as the energy content of the corresponding portion of the recorded waves varies from one part of the frequency range to another, the color of the pattern at any said point varying from one frame to another as the energy content of the corresponding part of the frequency range varies from one said portion of the recorded waves to another, the definition with which the varying frequency composition of the recorded waves is represented in the patterns substantially conforming with the resolution of the human ear.

RALPH K. POTTER.

REFERENCES CITED

The following references are of record in the file of this patent:

UNITED STATES PATENTS

| Number | Name | Date |
| --- | --- | --- |
| 2,147,499 | Rose | Feb. 14, 1939 |
| 2,184,075 | Goldstein | Dec. 19, 1939 |
| 2,403,986 | Lacy | July 16, 1946 |